Nov. 1, 1927.
J. R. WEST
1,647,896
DIRECTION SIGNAL
Filed Aug. 28, 1926
2 Sheets-Sheet 2
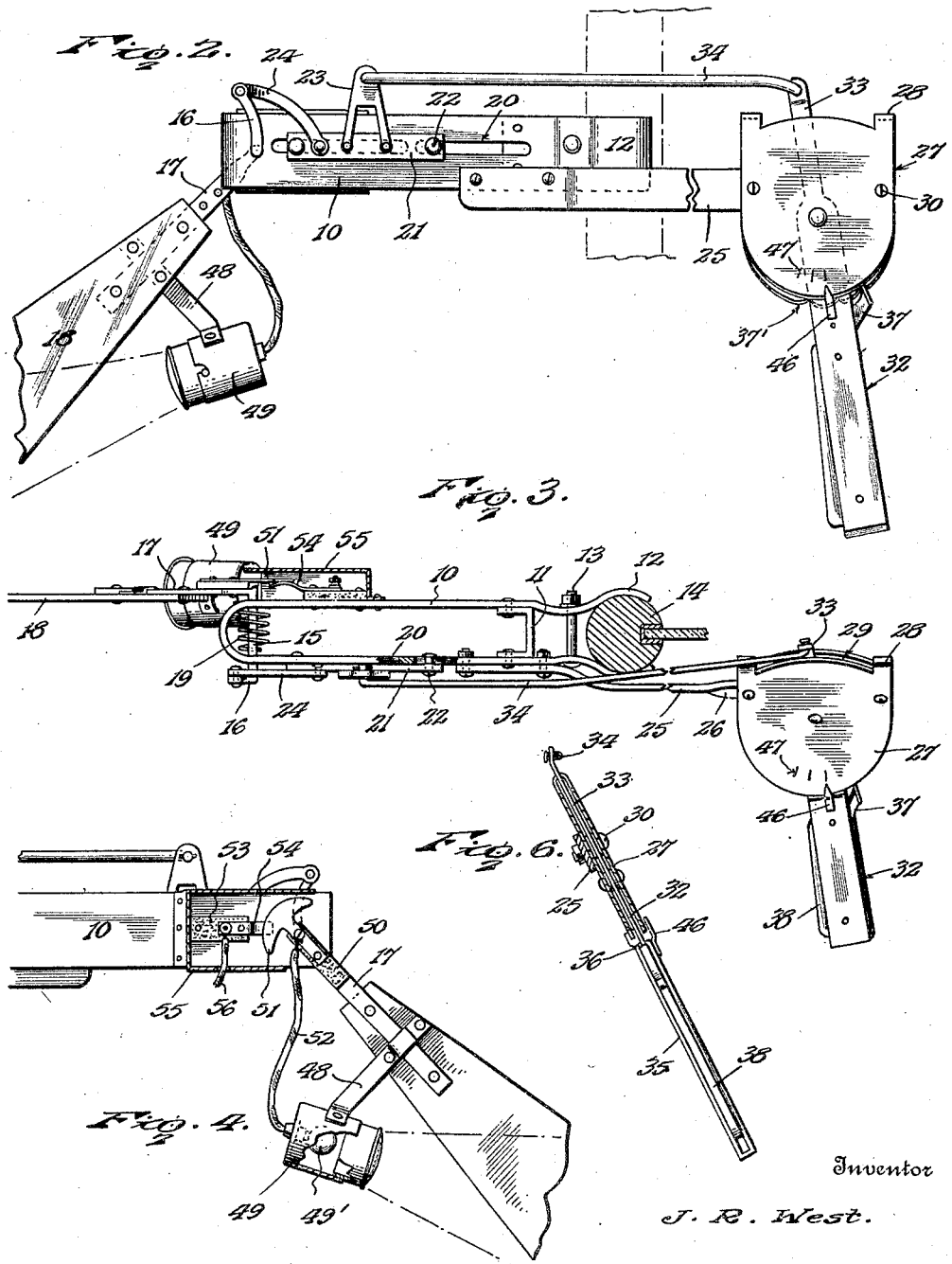
Inventor
J. R. West.
By Lacey & Lacey, Attorneys Patented Nov. 1, 1927.

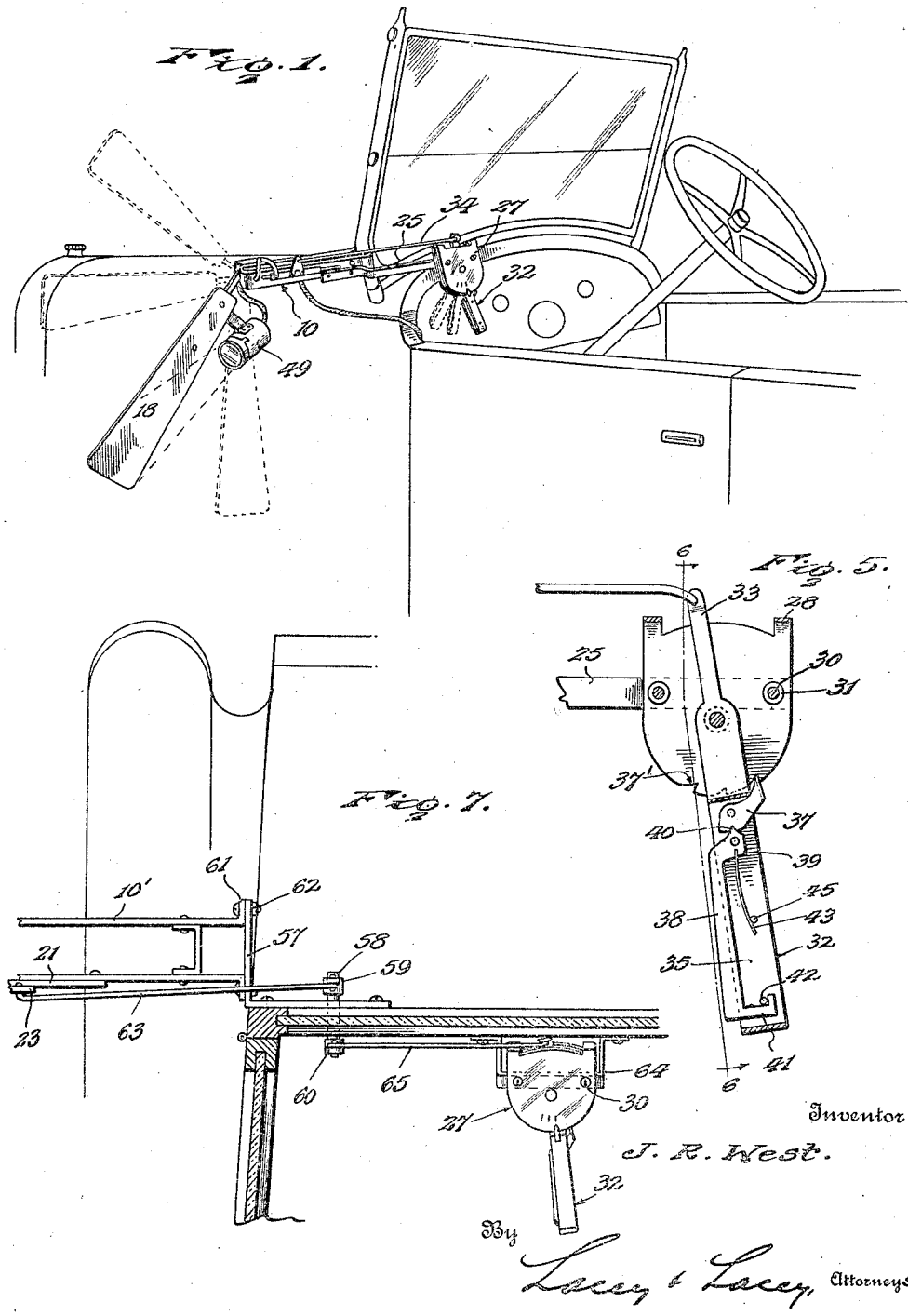

1,647,896

UNITED STATES PATENT OFFICE.

JOHN R. WEST, OF JACKSON, TENNESSEE.

DIRECTION SIGNAL.

Application filed August 28, 1926. Serial No. 132,249.

This invention relates to an improved traffic signal for motor vehicles and seeks, among other objects, to provide a simple and efficient device of this character whereby a driver may readily signal an intention to turn to the right or left, as well as an intention to stop.

And the invention seeks, as a further object, to provide a device embodying a novel mechanism for swinging the arm as well as locking the arm in signaling position.

Other objects of the invention not specifically mentioned in the foregoing will appear during the course of the following description.

In the accompanying drawings:

Figure 1 is a perspective view showing my improved device applied.

Figure 2 is a detail rear elevation of the device.

Figure 3 is a plan view of the device.

Figure 4 is a detail elevation particularly showing the switch.

Figure 5 is a detail sectional view showing the control lever and latch.

Figure 6 is a sectional view on the line 6—6 of Figure 5, looking in the direction indicated by the arrows.

Figure 7 is a plan view showing the device applied to a closed vehicle.

In carrying the invention into effect, I employ a substantially U-shaped bracket 10 preferably formed from a suitable sheet metal strip bent to the desired shape, and rigidly connecting the side members of the bracket near their free ends is a brace 11. At their free ends said side members terminate in a pair of jaws 12, and extending through said members near the inner ends of said jaws is a bolt 13 adjustable for clamping the jaws in engagement with a vehicle windshield post, as conventionally illustrated at 14. In Figure 1, I have shown the present device applied to a conventional motor vehicle. Journaled through the side members of the bracket 10 near the outer ends thereof is a shaft 15 which is formed at one end with a crank 16, and suitably fixed to the opposite end of said shaft is an angularly disposed crank 17 to which is riveted or otherwise attached a signal arm or blade 18. Surrounding the shaft 15 is a spring 19, one end of which is attached to the shaft while the other end of said spring is fixed to the bracket so that the spring will thus tend to rotate the shaft for swinging the arm 18 downwardly, as shown in dotted lines in Figure 1, to inactive vertical position.

Formed in the rearmost of the side members of the bracket 10, as particularly seen in Figures 2 and 3, are alined longitudinally extending slots 20 and overlying said slots is a plate 21, slidably connected with said side member by rivets or other fastening devices 22 extending through said slots. Rigidly fixed to the plate medially thereof is an upstanding arm 23, and pivotally connected at one end with the forward end portion of the plate is a longitudinally curved link 24, the opposite end of which is pivotally connected to the free end of the crank 16. Thus, as will be appreciated, as the plate 21 is shifted longitudinally upon the bracket 10, the crank 16 will be swung by the link 24 for rocking the shaft 15 and swinging the signal arm 18.

Detachably fixed to the rear side member of the bracket 10 near its inner end is a longitudinally extending arm 25 which, as seen in Figure 3, is offset to clear the adjacent jaw 12 of the bracket while the free end portion of the arm is given approximately a quarter turn, as indicated at 26, and mounted upon the free end of the arm is a head 27. The head is preferably struck from a piece of suitable resilient sheet metal bent into shape and, as best seen in Figure 6, comprises front and rear side plates connected at their upper ends by straps 28, the metal being cut away between said straps to define a slot 29 at the upper end of the head. Extending through the side plates of the head and through the free end of the arm 25 are the bolts 30 detachably connecting the head with the arm, and surrounding the bolts between the plates, as seen in Figure 5, are washers 31 spacing the plates apart.

Pivoted between the side plates of the head 27 is a control lever 32 having a reduced upper end 33 which projects through the slot 29 of the head, and connecting the upper end of said lever with the arm 23 of the plate 21 is a rod 34. The lower end portion of the lever, as seen in Figure 6, is bent upon itself to define a flat, oblong loop 35, the front side member of which is spaced at its free end from the rear side member of said loop by a terminal flange 36 and pivoted between the side members of said loop near the inner end thereof is a latch 37 selectively engageable in notches 37' in the lower edge of the rear side plate of the head 27, the lower edges of both side plates being struck on an arc concentric to the pivotal center of the lever. Mounted to swing upon the lever 32 is a latch lever 38 which projects at the rear edge of the former lever and is provided at its inner end with a laterally directed head 39 pivoted between the side members of the loop 35. Formed on said head is a V-shaped lug 40 which freely engages in a similarly shaped notch in the adjacent edge of the latch 37, and formed on the outer end of the latch lever to extend between the side members of the loop 35 is an L-shaped keeper 41 engageable with a pin 42 for limiting the lever in its swinging movement under the influence of a spring 43. The spring 43 is fixed at one end to the head 39 and bears near its free end against a pin 45 for swinging said lever outwardly and normally holding the latch 37 against the lower edge of the rear side plate of the head 27. Fixed to the lower end portion of the lever 32 is a pointer 46, and arranged upon the front side plate of the head 27 are suitably located marks 47 for indicating the different signaling positions of the arm 18.

As shown in Figure 1, the arm 25 is of a length to support the head 27 and lever 32 in front of the instrument board of the vehicle so that said lever may be readily grasped and swung for actuating the signal arm 18 and it will now be assumed that said arm is in vertical inactive position. Accordingly, as will be seen, when the lever is swung to the left, as seen in Figure 1, to engage the latch 37 in the first of the notches 37', the plate 21 will be shifted inwardly upon the bracket 10 until the arm 18 is raised to the full line position illustrated for signaling an intention to stop. Upon further movement of the lever 32 to the left until the latch 37 engages in the intermediate one of the notches 37', the arm 18 will be raised to horizontal position for signaling an intention to turn to the left, while still further movement of the lever 32 to the left until the latch 37 engages in the last of the notches 37', will then serve to swing the arm 18 to upwardly inclined position for signaling an intention to turn to the right. To return the signal arm to normal inactive position, the lever 32 is grasped to rock the latch lever 38 inwardly. The lug 40 will thus be caused to rock the free end of the latch 37 away from the rear side plate of the head 27, when the lever 32 will be freed so that the signal arm may swing downwardly to vertical position.

Fixed to the inner end of the arm 18, as best seen in Figure 4, is a depending bracket 48, and fixed to the lower end of said bracket is a lamp housing 49 in which is mounted a lamp 49'. Fixed to the inner end of the crank 17 is an insulating block 50, and secured to said block is a switch blade 51 connected by a wire 52 with the lamp 49'. Mounted upon the forward side member of the bracket 10 near its outer end is an insulating block 53, and secured to said block is a switch blade 54 disposed to yieldably cooperate with the blade 51. Enclosing the switch blades is a casing 55. The blade 54 is connected by a wire 56 with the battery of the vehicle or other suitable source of electrical energy thereon, and, preferably, a suitable switch is interposed in the circuit so that said circuit may be manually controlled. As will be seen, when the switch blade 54 is energized, the switch blade 51 will, when the signal arm 18 is swung up to any one of its signaling positions, engage the blade 54 for closing the circuit through the lamp 49' so that the signal arm will be illuminated and, as shown in Figure 4, the lamp housing is mounted in a plane with the signal arm therebeneath so that the beam of light will illuminate both sides of the arm throughout the major portion of the length thereof.

In Figure 7 of the drawings, I have illustrated a slight modification of the invention which is particularly intended for use on closed vehicles, a portion of a closed motor vehicle being conventionally shown. Secured to the cowl of the vehicle body or other appropriate part thereof at the front left hand corner of the body is an angle bracket 57, and journaled through the cowl and through said bracket is a shaft 58 to the outer end of which is fixed a lever 59, while a similar lever 60 is secured to the inner end of the shaft. The bracket of the signaling device is indicated at 10'. This bracket is identical with the bracket 10, with the exception that the jaws 12 are omitted. In lieu of said jaws, the side members of the bracket 10' are provided at their inner ends with laterally directed lugs 61, and securing said lugs to the bracket 57 are bolts or other fastening devices 62. Thus, the bracket 10' is rigidly mounted, and connecting the lever 59 of the shaft 58 with the arm 23 of the plate 21 is a rod 63 corresponding to the rod 34.

Supplanting the arm 25 as employed in the preferred embodiment of the invention, is a U-shaped bracket 64, the ends of which are secured to the instrument board or other convenient part of the vehicle body and, as will be observed, the head 27 is secured to said bracket by the bolts 30. Thus, the head is rigidly mounted so that the lever 32 may be operated with facility, and connecting said lever with the lever 60 of the shaft 58 is a rod 65 which is also similar to the rod 34. Otherwise, the modified structure is identical with the preferred embodiment of the invention and, as will be seen, when the lever 32 is swung, the shaft 58 will be rocked for shifting the plate 21 longitudinally and operating the signal arm.

Having thus described the invention, what I claim is:

1. A direction signal including a bracket, a shaft journaled thereon and provided with a crank, a signal arm carried by the shaft, a plate slidably interlocked with the bracket and having an arm rigidly secured thereto, a link pivotally connecting the crank and plate, a rod having one end pivotally connected to the arm, and means for sliding the rod and thus the plate to impart swinging movement to the shaft.

2. A direction signal including a U-shaped bracket, the inner ends of its side arms being provided with jaws, a shaft journaled adjacent the bight portion of the bracket, a signal arm fixed to the shaft, one arm of said bracket having spaced slots therein, a plate having securing devices carried thereby for slidably engaging said slots, a link pivotally connecting the plate and shaft, an arm fixed to the plate, a rod pivotally connected to the arm and means for sliding the rod, as and for the purpose set forth.

In testimony whereof I affix my signature.

JOHN R. WEST. [L. S.]